(12) United States Patent
Hawkins

(10) Patent No.: US 11,215,277 B2
(45) Date of Patent: Jan. 4, 2022

(54) EPICYCLIC GEARING TORQUE REDUCTION MECHANISM

(71) Applicant: John Matthew Hawkins, Brownsburg, IN (US)

(72) Inventor: John Matthew Hawkins, Brownsburg, IN (US)

(*) Notice: Subject to any disclaimer, the term of this patent is extended or adjusted under 35 U.S.C. 154(b) by 0 days.

(21) Appl. No.: 16/830,891

(22) Filed: Mar. 26, 2020

(65) Prior Publication Data
US 2021/0123521 A1    Apr. 29, 2021

Related U.S. Application Data

(63) Continuation of application No. 16/663,096, filed on Oct. 24, 2019, now Pat. No. 11,009,118.

(51) Int. Cl.
| | | |
|---|---|---|
| *F16H 57/08* | (2006.01) | |
| *F16H 57/023* | (2012.01) | |
| *F16H 1/36* | (2006.01) | |

(52) U.S. Cl.
CPC ............. *F16H 57/08* (2013.01); *F16H 1/36* (2013.01); *F16H 57/023* (2013.01); *F16H 2057/085* (2013.01)

(58) Field of Classification Search
None
See application file for complete search history.

(56) References Cited

U.S. PATENT DOCUMENTS

| | | | | | |
|---|---|---|---|---|---|
| 1,880,982 | A | * | 10/1932 | Rawlings | G01C 19/34 248/581 |
| 2,027,655 | A | * | 1/1936 | Stoeckicht | F16H 1/2818 475/344 |
| 2,801,552 | A | * | 8/1957 | Stubbings | F16H 1/2818 475/347 |
| 3,026,745 | A | * | 3/1962 | Shannon | F16H 1/2818 475/346 |
| 4,133,216 | A | * | 1/1979 | Gentile | F16H 57/023 74/384 |
| 4,158,967 | A | * | 6/1979 | Vatterott | F16H 1/2836 475/331 |
| 4,424,726 | A | * | 1/1984 | Galbraith | F16H 15/52 475/185 |
| 5,890,990 | A | * | 4/1999 | Palau | F16H 1/28 475/346 |
| 7,621,843 | B2 | * | 11/2009 | Madge | F03D 15/10 475/346 |
| 8,632,437 | B2 | * | 1/2014 | Dinter | F16H 57/028 475/347 |
| 9,856,966 | B2 | * | 1/2018 | Wilson | F03D 80/70 |
| 10,495,210 | B2 | * | 12/2019 | Hasan | F16H 57/032 |
| 2019/0120363 | A1 | * | 4/2019 | Grubba | F16H 57/023 |

* cited by examiner

*Primary Examiner* — Dirk Wright
(74) *Attorney, Agent, or Firm* — Andrew Morabito

(57) ABSTRACT

The present invention is a torque reduction system comprising: a planetary gear set comprising; a sun gear, planetary gears, and a ring gear having at least one mount, a linkage arm having a first end and second end connected to the ring gear and a housing, wherein the linkage arm has one aperture at a first end and at least two apertures at the second end, and a slot positioned between the first and second end relative to the at least one mount of the ring gear; and at least one bearing positioned between the housing and the ring gear.

15 Claims, 4 Drawing Sheets

EPICYCLIC GEARING TORQUE REDUCTION MECHANISM

CROSS-REFERENCE TO RELATED APPLICATIONS

This application is a continuation of U.S. application Ser. No. 16/663,096 filed Oct. 24, 2019. The disclosure of the prior applications is considered part of (and is incorporated by reference in) the disclosure of this application.

BACKGROUND OF THE INVENTION

The present invention relates to a torque reduction mechanism, and more particularly to epicyclic gearing torque reduction.

The conventional single main rotor helicopters require the production of massive torque forces to generate the desired lift. Through the conversion of the power generated by the engine, an epicyclic gearing is able to convert this power into rotation of the rotors. This conversion of power through the epicyclic gearing is used in many other machines and tools, especially those machines and tools that already employ a planetary gear reduction system.

In the majority of these machines and tools, the rotational of the mechanical components to generate to desired effect result in a large torque force being created. This torque for has to be accounted for when designing the engine or machinery to properly accommodate the design of the shafts, gears, housing, and mechanical components to account for this force.

This is especially true when there is a speed reduction gearbox, such as used in a helicopter, or a speed increasing gearbox, such as used in a wind turbine. In the case of a conventional single main rotor helicopter, if there are mechanical failures, it can result in catastrophic consequences. The components of the helicopter engine, transmission, and overall structure need to be constructed to withstand these incredibly high forces.

Currently, the only means to counteract the torque force is to design the components of the engine to withstand these forces, or incorporate elaborate and extensive systems to reduce the torque while attempting to maintain the desired rotations per minute (rpm) of the engine or in the case of the helicopter the rotors. This results in either the use of expensive materials, increasing the overall strength of the components (typically increasing the weight) or incorporating complex systems to counteract these forces.

SUMMARY

In a first embodiment, the present invention is a torque reduction system for an epicyclic gearing system, comprising: a power source; a sun gear connected to the power source; planetary gears in communication with the sun gear; a ring gear in communication with the planetary gears.

In a second embodiment, the present invention is a torque reduction system comprising: a planetary gear set comprising; a sun gear, planetary gears, and a ring gear, and at least two linkage arms connected to the ring gear and a housing, wherein the ring gear is restrained from motion.

A torque reduction system comprising: a planetary gear set comprising; a sun gear, planetary gears, and a ring gear, a linkage arm connected to the ring gear and a housing, wherein the ring gear is restrained from motion; and two bearings, wherein the bearings are in contact with the ring gear and a housing element.

DETAILED DESCRIPTION OF THE INVENTION

Figure 1:
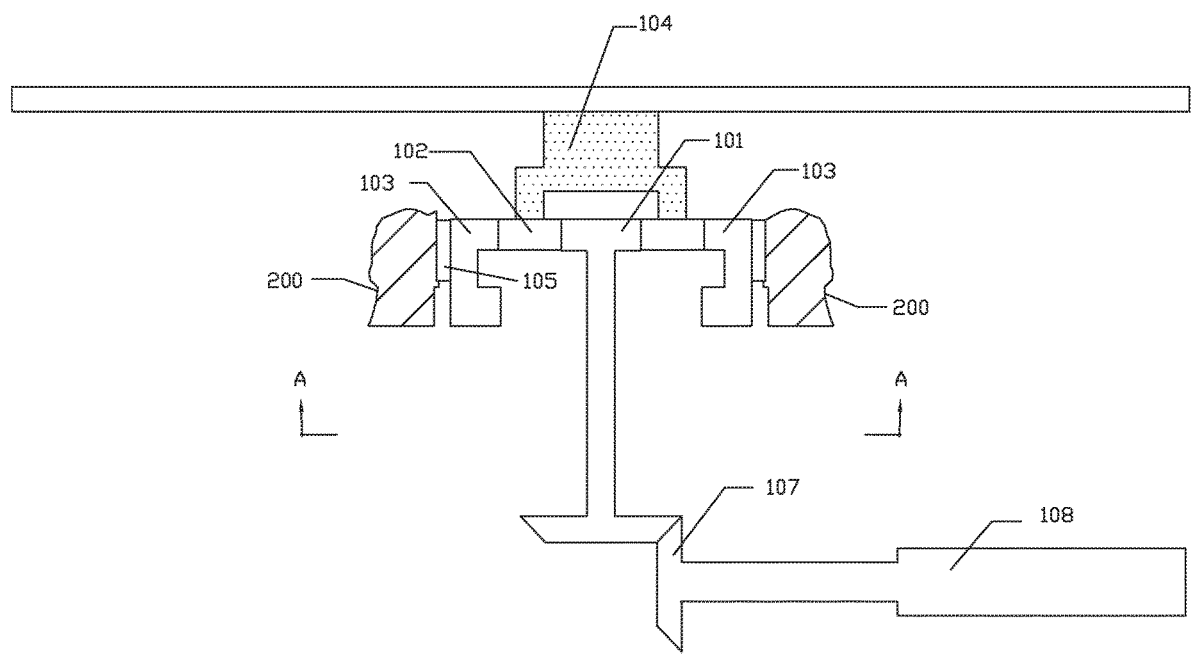
FIG. 1 depicts an illustration of an engine with the torque reduction mechanism integrated, in accordance with one embodiment of the present invention.

The present invention provides a mechanism, system, and/or components which are designed to reduce or eliminate the rotational forces generated by an engine. With the torque reduction mechanism integrated into the gearing, the rotational forces generated by the power source can be transmitted to components of the machine which are able to handle the higher stresses and forces, leaving the vital and sometimes delicate components of the engine free of the excess or dangerous torque forces. This is advantageous to allow for the vital or delicate gears or internal components of an engine or gearing set to be designed with less strength requirements to operate safely.

In several embodiments, the device is used in a helicopter is used; however, this is purely for exemplary purposes. This invention can be implemented in any machine or tool that employs an epicyclic gearing with a planetary gear set. The invention is advantageous for a helicopter, because flight safety is improved if there is a loss of tail rotor effectiveness. Loss of tail-rotor effectiveness (LTE) occurs when the tail rotor of a helicopter is exposed to wind forces that prevent it from carrying out its function that of cancelling the torque of the engine and transmission. Any low-airspeed high-power environment provides an opportunity for it to occur. Currently, with loss of tail rotor functioning, the pilot usually must immediately enter autorotation, but this is not always safe to do. Eliminating approximately 80% of main rotor yaw reaction torque allows the pilot to pick up forward fight speed and avoid autorotation. Or, the pilot can enter autorotation with better control of the helicopter. Approximately 80% of the yaw reaction torque will be eliminated.

For applications in other mechanical instances such as with hand tools and machines, e.g. a pneumatic torque wrench, approximately all of the yaw torque will be eliminated. The mechanism is bidirectional, and it cancels torque regardless of the direction of rotation.

In addition to improving flight safety, there are additional beneficial changes to the overall helicopter design. The tail rotor could be shrunk in size. The tail boom can be shortened, and as an example, an enclosed tail rotor could be relocated to be in back of the passenger cabin.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. It is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements or use of a "negative" limitation.

FIG. 1 depicts an illustration of an engine 108 with the torque reduction mechanism integrated, in accordance with one embodiment of the present invention. In the depicted embodiment, the gear set is comprised of a sun gear 101, planetary gears 102, a ring gear 103, and the carrier 104. In some embodiments, the sun gear 101 is connected to the engine 108 through a beveled gear mesh 107. In the disclosed examples, the epicyclic gear train incorporates a planetary gear set is shown in a helicopter application. This planetary gear set is for the final drive connecting the gear shaft to the main rotor to generate the necessary forces to rotate the rotors. Typically, in this design, the ring gear 103 is bolted to the housing or the body of the helicopter 200 and in reduced to a stationary position, permitting the planetary gears 102 to rotate and transfer this rotation to the carrier 104 and then to the rotor 201.

The present invention incorporates three (3) bearings 105 which are positioned between the ring gear 103 and the housing 200, and a linkage arm (not shown) to connect the ring gear 103 to the housing 200. In one embodiment, the bearings 105 are simple steel rods. In additional embodiments, the bearings 105 may be made from other materials, and have varying diameters and lengths. Through the incorporation of the bearings 105, the rotor transmission is no longer directly connected to the housing 200, and the linkage arms removes the reaction torque which is normally transmitted by the ring gear 103. In a preferred embodiment, the linkage arm 106 is attachment to the ring gear 103.

To identify the reduction in forces which are transferred to the housing 200, the calculation below is shown to depict the present transfer of forces from the components of the planetary gear set to the housing 200:

T=torque $T_{bvg}$=reaction torque acting on housing 200 due to the first bevel gearbox output torque. The first bevel gearbox output torque is equal to the planetary sun gear input torque.

$T_{ring\ gear}$=reaction torque of the ring gear against the airframe.

$T_{main}$ rotor blades=reaction torque of the atmosphere acting against the main rotor blades.

From Conservation of Angular Momentum, the sum of the torques acting on the main rotor must equal zero.

$$T_{bvg}+T_{ring\ gear}+T_{main\ rotor\ blades}=0$$

$$T_{planetary\ input}+T_{ring\ gear}=-T_{main\ rotor\ blades}$$

$$T_{ring\ gear}=-T_{main\ rotor\ blades}-T_{planetary\ input}$$

$$X=|T_{main\ rotor\ blades}|-|T_{planetary\ input}|$$

In one embodiment, with a 5:1 speed reduction in the planetary gear set the bevel gear mesh, will transfer one fifth, or 20% of the original yaw torque to the housing 200. The ring gear 103 then transfers approximately 80% of the total airframe yaw torque to the housing 200. This therefore cancels approximately 80% is cancelled by the invention.

Figure 2:
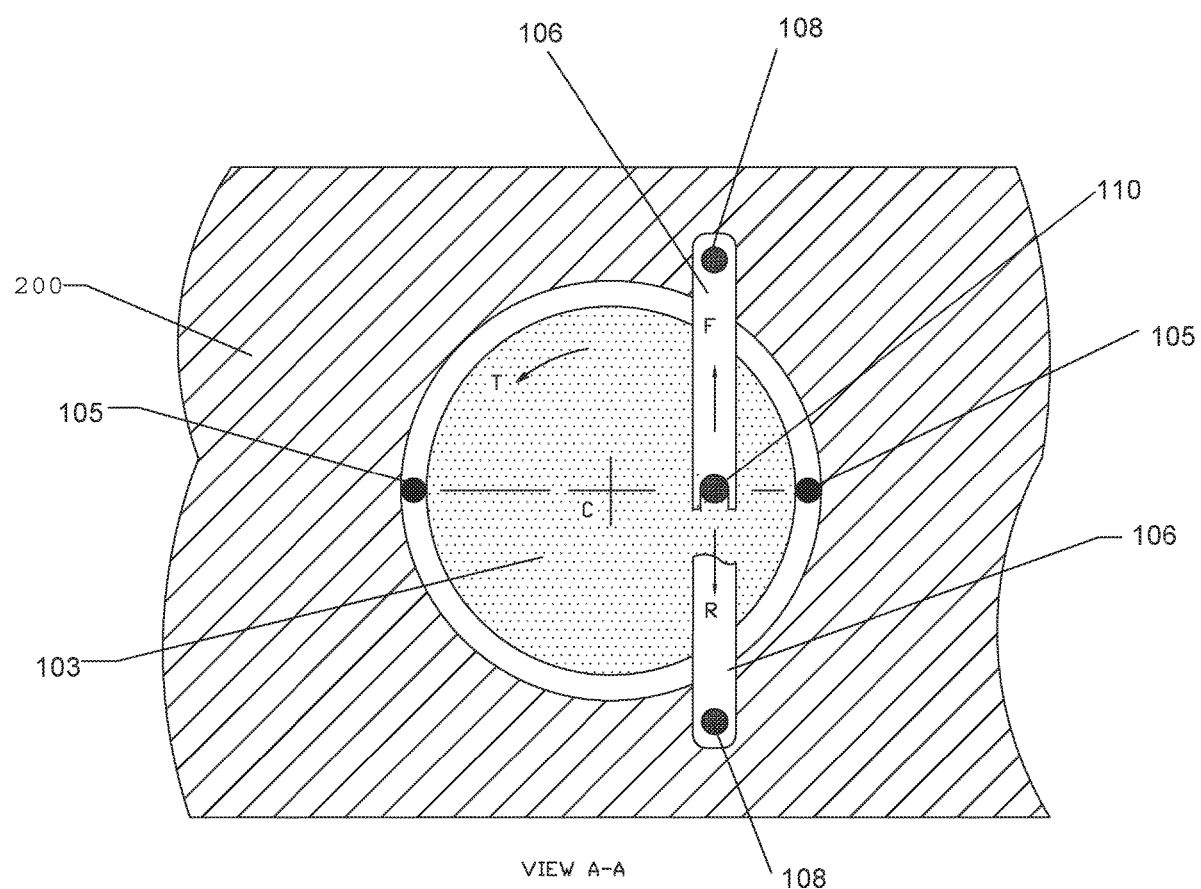
FIG. 2 depicts an illustration of a cross section of the torque reduction mechanism, in accordance with one embodiment of the present invention.

FIG. 2 depicts an illustration of a cross section of the torque reduction mechanism, in accordance with one embodiment of the present invention. The linkage arm 106 is show attached to the ring gear 103 and the housing 200 by mounting points 108 at each end of the linkage arm 106 and a mounting point 110 near the middle of the linkage arm 106. The middle mounting point 108 is connected to the ring gear 103. The attachment location of the linkage arms 106 to the ring gear 103 and the housing 200 direct the required length of the linkage arms 106. Two bearings 105 are shown positioned between the ring gear 103 and the housing 200. In additional embodiments, additional bearings 105 may be placed between the ring gear 103 and the housing 200.

The linkage arm 106, is shown connecting to the housing 200 at a first end and a second end. These mounts 108 and 110 are relative to the dimensions of apertures on linkage arm 106 sized to receive the mounts 108. The linkage arm 106 has a slot to receive mount 114. The linkage arm 106 has apertures or slots to receive the mounts 108. The apertures are designed to receive the mount 108, as each of the mounts 108 may be different sizes, shapes, or the like and each aperture is designed to receive the respective mount 108. In the depicted embodiment, the mount 110 fits within a slot to permit a controlled displacement of the linkage arm 106 based on the slot size. In the depicted embodiment, the length of the linkage arm 106 is of varying length based on the application of the invention. The linkage arm may have enlarged sections distal to the mounting points to assist in handling the forces applied to the linkage arm 106. In additional embodiments, the linkage arms 106 may have varying designs based on the application of the linkage arm 106. In some embodiments, the ends of the linkage arm 106 have openings to receive various mounting hardware (e.g. screws, rivet, etc.) to mount the linkage arm 106 to housing 200 and the ring gear 103. In some embodiments, the ring gear 103 or the housing 200 and the linkage around 106 are a unitarily created component.

The reaction forces exerted by the linkage arm 106 on the housing 200 create offsetting moments of the forces applied to the ring gear 103. One of the bearings 105 reacts a force equal and opposite to the force on the linkage arm.

Moments that create a yaw torque will be taken around the centerline of the main rotor. There will be zero net torque from the ring gear acting on the airframe, when:

Torques balance regardless of center of gravity. Loading cargo and passengers will not change the torque cancellation. The center of gravity is usually close to the vertical centerline of the main rotor, although this is not necessary for this invention to work.

Forces F and R are equal and opposite. F is the result of the applied torque. R is the equal and opposite force reaction. F and R create equal and opposite moments about the ring gear, and main rotor, center C. As the forces are equal and opposite, and the moments are equal and opposite, the housing is in static equilibrium.

Torques balance regardless of center of gravity of the helicopter. Loading cargo and passengers will not change the torque cancellation. The center of gravity is usually close to the vertical centerline of the main rotor, although this is not necessary for this invention to work.

The linkage arms 106, are designed to meet and/or exceed the strength of the forces which are applied to the linkage arms 106. The shape, size, length, cross section, and design of the linkage arms 106 is modifiable to meet the requirements of the application.

Figure 3:
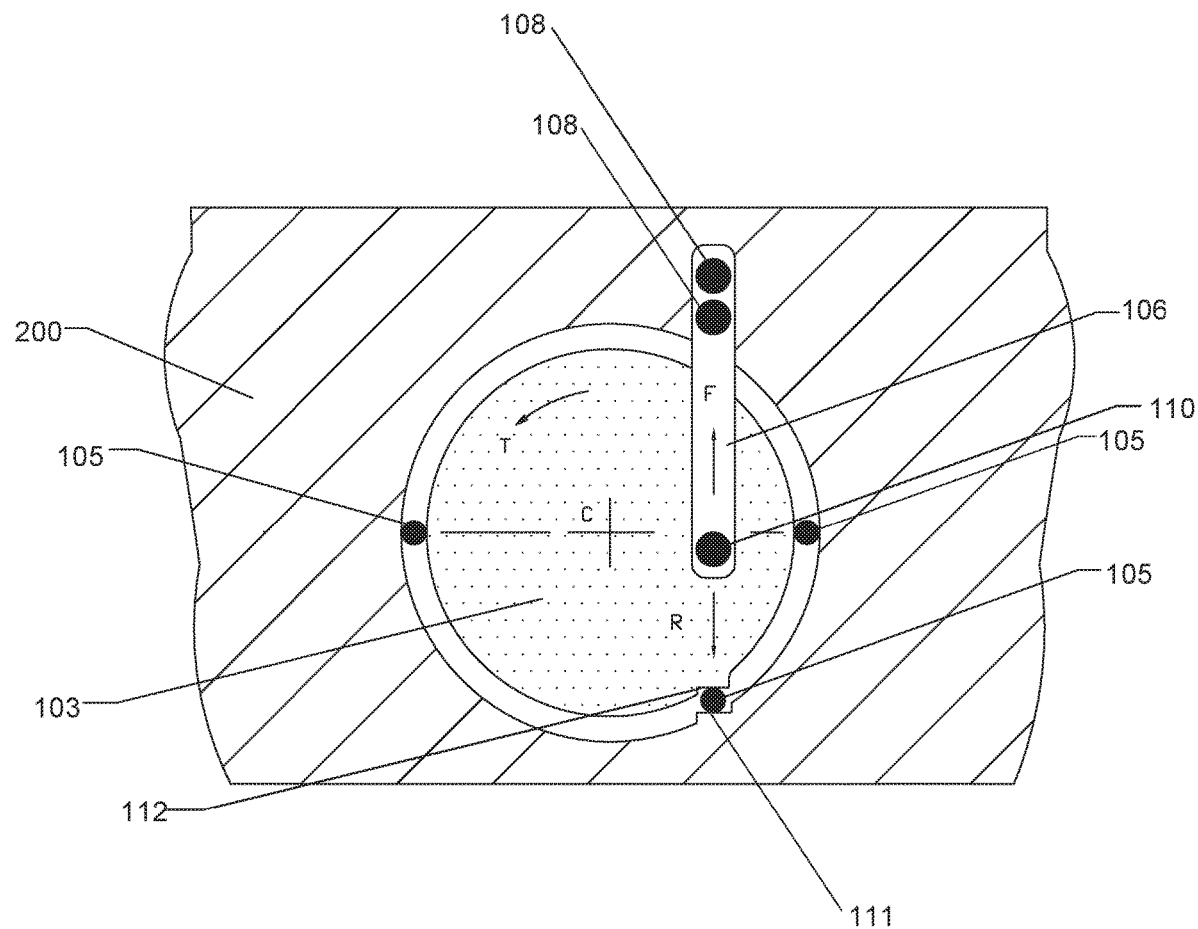
FIG. 3 depicts an illustration of a cross section of the torque reduction mechanism, in accordance with another embodiment of the present invention.

FIG. 3 depicts an illustration of a cross section of the torque reduction mechanism, in accordance with another embodiment of the present invention. In the present embodiment, the housing 200 has two mounting points 108 at one end of the linkage arm 106 and a mount 110 on a second end is connected to the ring gear 103. Additionally, the ring gear 103 and the housing 20 has a notch 111 and the ring gear 108 has a notch 112 which a bearing 105 is positioned in between the notches. The notch provides for a stop between the ring gear 103 and the housing 200 rotation in either direction, but also provides for some opportunity for movement and the application of the force on the bearing 105 instead of the linkage arm 106 Additionally, there are a minimum of three bearing 105 placed between the ring gear 103 and the housing 200.

Figure 4:
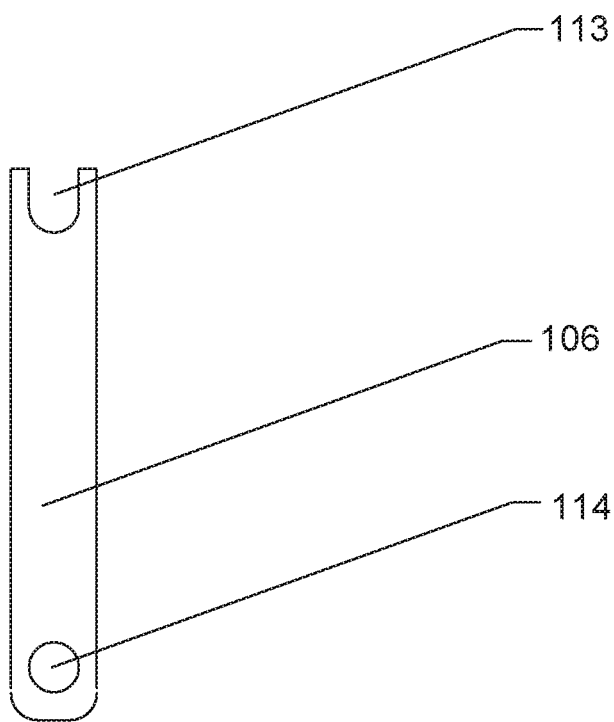
FIG. 4 depicts an illustration of a linkage arm, in accordance with an embodiment of the present invention.

FIG. 4 depicts an illustration of a linkage arm 106, in accordance with another embodiment of the present invention. In the depicted embodiment, the linkage arm 106 has a mounting aperture 114 and a slot 113. The mounting aperture 114 is sized and shaped to fit the mounting point (108 or 110). The slot 113 is also sized and positioned along the linkage arm 106 to provide for the movement of the linkage arm (and thus the ring gear 103) about the mounting point (108 or 110). The number of mounting apertures 114 and slots 113 as well as the position of the apertures and slots is adjustable based on the design of the torque reduction mechanism. In various embodiments, the linkage arms 106 may have various profiles, contours, and overall design based on the application requirements, limitations. For example, the torque reduction mechanism can be implemented in a helicopter or in a socket wrench, and both applications require different requirements but using the same mechanism design.

In various embodiment the torque reduction mechanism may have one or more linkage arms with a variety of apertures and slots to properly connect the ring gear 103 and the housing 200 via the linkage arm. In embodiments, where more than one linkage arm is present, the linkage arms may have differing designs, profiles, apertures, slots, and the like. The quantity and positioning of the apertures and slots on the linkage arms is to provide the desired movement of the ring gear relative to the housing and the size of the slots and apertures and the location on the linkage arm are positioned to permit this movement. The linkage arms are also designed relative to the mounting points of the ring gear 103 and the housing 200. The application of the invention from helicopters to torque wrenches may require alterations to the layouts shown in the Figures to achieve the torque reduction identified in the methods of this patent application.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

The foregoing descriptions of various embodiments have been presented only for purposes of illustration and description. They are not intended to be exhaustive or to limit the present invention to the forms disclosed. Accordingly, many modifications and variations of the present invention are possible in light of the above teachings will be apparent to practitioners skilled in the art. Additionally, the above disclosure is not intended to limit the present invention. In the specification and claims the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g. attached, adhered, joined) are to be construed broadly and may include intermediate members between a connection of elements and relative movement between elements. As such, joinder references do not necessarily infer that two elements are directly connected and in fixed relation to each other. Moreover, network connection references are to be construed broadly and may include intermediate members or devices between network connections of elements. As such, network connection references do not necessarily infer that two elements are in direct communication with each other. In some instances, in methodologies directly or indirectly set forth herein, various steps and operations are described in one possible order of operation, but those skilled in the art will recognize that steps and operations may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to the embodiments outlined above, various alternatives, modifications, variations, improvements and/or substantial equivalents, whether known or that are or may be presently foreseen, may become apparent to those having at least ordinary skill in the art. Listing the steps of a method in a certain order does not constitute any limitation on the order of the steps of the method. Accordingly, the embodiments of the invention set forth above are intended to be illustrative, not limiting. Persons skilled in the art will recognize that changes may be made in form and detail without departing from the spirit and scope of the invention. Therefore, the invention is intended to embrace all known or earlier developed alternatives, modifications, variations, improvements and/or substantial equivalents.

What is claimed is:

1. A torque reduction system for an epicyclic gearing system, comprising:
   a power source;
   a sun gear connected to the power source;
   planetary gears in communication with the sun gear;
   a ring gear in communication with the planetary gears; and
   at least one linkage arm connected to the ring gear and a housing, wherein the linkage arm has at least one aperture and at least one slot.

2. The torque reduction system for an epicyclic gearing system of claim 1, wherein the linkage arm has a first end, a second end, and a center axis spanning from the first end to the second end, and the first end of the linkage arm is connected to the ring gear, and the second end of the linkage arm is connected to the housing at two pins. Bolts can be used in place of pins.

3. The torque reduction system for an epicyclic gearing system of claim 2, wherein the center axis of the linkage arm and an axis from the center of the connection point of the first end and a center of the ring gear form a substantially 90-degree angle.

4. The torque reduction system for an epicyclic gearing system of claim 3, wherein the length of the linkage arm is determined by a torque force generated by the ring gear.

5. The torque reduction system for an epicyclic gearing system of claim 1, further comprising bearings, wherein the bearings are positioned between the ring gear and the housing.

6. A torque reduction system comprising:
   a planetary gear set comprising;
      a sun gear,
      planetary gears, and
      a ring gear having at least one mount,
   a linkage arm having a first end and second end, wherein the first end of the linkage arm is connected to the ring gear and the second end is connected to a housing, and wherein the linkage arm has one aperture at a first end and at least two apertures at the second end; and
   at least one bearing positioned between the housing and the ring gear.

7. The torque reduction system of claim 6, wherein a center axis of the linkage arm and the sun gear form a 90-degree angle.

8. The torque reduction system of claim 6, wherein the linkage arm has a predetermined contour based on the applied forces.

9. The torque reduction system of claim 6, wherein the linkage arms and the ring gear are a single element.

10. The torque reduction system of claim 6, wherein the linkage arm is connected to the ring gear and a housing, and the linkage arm-is in a static position.

11. The torque reduction system of claim 6, further comprising a set of bearings, wherein the bearings are positioned between the housing and the ring gear.

12. The torque reduction system of claim 11, wherein the bearings are designed to guide the force reactions between the housing and the ring gear.

13. The torque reduction system of claim 6, wherein the linkage arms is designed to withstand the force transferred to the housing from the ring gear.

14. The torque reduction system of claim 13, wherein the position of the linkage arms is based on the force applied to the linkage arms.

15. A torque reduction system comprising:
   a ring gear having at least one mount and a notch;
   a housing having at least two mounts and a notch substantially similar to the notch of the ring gear;
   a linkage arm connected to the ring gear about the at least one mount and the housing about the at least two mounts; and
   at least three bearings, wherein the bearings are in contact with the ring gear and the housing, and at least one bearing is positioned between the notch of the housing and the notch of the ring gear.

* * * * *